United States Patent [19]

Zegers et al.

[11] 3,824,468

[45] July 16, 1974

[54] SYSTEM FOR TRANSMITTING INFORMATION IN THE PRESCRIBED FREQUENCY-BAND

[75] Inventors: Leo Eduard Zegers; Wilfred Andre Maria Snijders, both of Emmasingel, Eindhoven, Netherlands

[73] Assignee: U.S. Philips Corporation, New York, N.Y.

[22] Filed: Sept. 13, 1967

[21] Appl. No.: 667,534

[30] Foreign Application Priority Data

Sept. 14, 1966 Netherlands ...................... 6612935

[52] U.S. Cl. .......... 325/32, 179/1.5 R, 179/1.5 FS, 325/40, 325/47

[51] Int. Cl. ............................................ H04k 1/04

[58] Field of Search ............ 325/32, 34, 40, 47, 63, 325/122, 148; 178/69.5

[56] References Cited

UNITED STATES PATENTS 3,696,207 10/1972 Lundin et al. ........................ 325/32

*Primary Examiner*—Maynard R. Wilbur
*Assistant Examiner*—H. A. Birmiel
*Attorney, Agent, or Firm*—Frank R. Trifari; Henry I. Steckler

[57] ABSTRACT

A transmission system in which auxiliary information in the form of a pulse pattern is transmitted with main information without frequency or time separation. Secrecy in the system is increased by also varying the frequency of the main information in accordance with the pulse pattern.

8 Claims, 4 Drawing Figures

INVENTORS
LEO E. ZEGERS
WILFRED A.M. SNIJDERS
BY
Frank R. Trifari
AGENT

INVENTORS
LEO E. ZEGERS
WILFRED A.M. SNIJDERS
BY
Frank R. Trifari
AGENT

SYSTEM FOR TRANSMITTING INFORMATION IN THE PRESCRIBED FREQUENCY-BAND

The invention relates to a transmission system comprising a transmitter and a receiver for the transmission of information in the prescribed frequency band, in which the information to be transmitted in total emanates from a main information source and an associated auxiliary information source. The information signals can be transmitted either directly or after modulation, for example, amplitude modulation or frequency modulation.

It has been proposed for such a transmission system to form the auxiliary information signal by a periodical pulse pattern located within the frequency band of the main information signal and non-correlated thereto and emanating from an auxiliary information source formed by a pulse pattern generator, which pulse pattern is combined in the transmitter in a linear combination device without frequency separation and without time separation with the main information signal, whereas in the receiver the main information signal and the pulse pattern located within the frequency band of the former and linearly combined therewith are applied to a modulation device to which, in addition, is applied the locally obtained pulse pattern, which emanates from a local pulse pattern generator corresponding to the pulse pattern generator of the transistor whilst the output of the modulation device is connected to a smoothing filter which is connected, for automatic phase correction, to a frequency determining member of the local pulse pattern generator. Moreover, at the transmitter end and at the receiver end the pulse pattern generators are provided each with a shift register comprising a number of shift register elements the contents of which are shifted on by a clock-pulse generator connected to said elements.

The invention has for its object to provide a transmission system of the kind set forth for keeping a secret the main information signals, in which a high degree of secrecy is attained in a simple manner.

The transmission system according to the invention is characterized in that at the transmitter end and at the receiver end the circuit of the main information signal includes a frequency transposition stage fed by a carrier oscillator which is connected, for varying the carrier frequency to a frequency corrector, to which via an impedance network, the shift register is connected.

The impedance network can be formed by coils, capacitors, tuned circuits and the like. Preferably the impedance network is formed by a resistor network connected to the shift register elements.

The invention and its advantages will now be described more fully with reference to the Figures.

Figure 1:
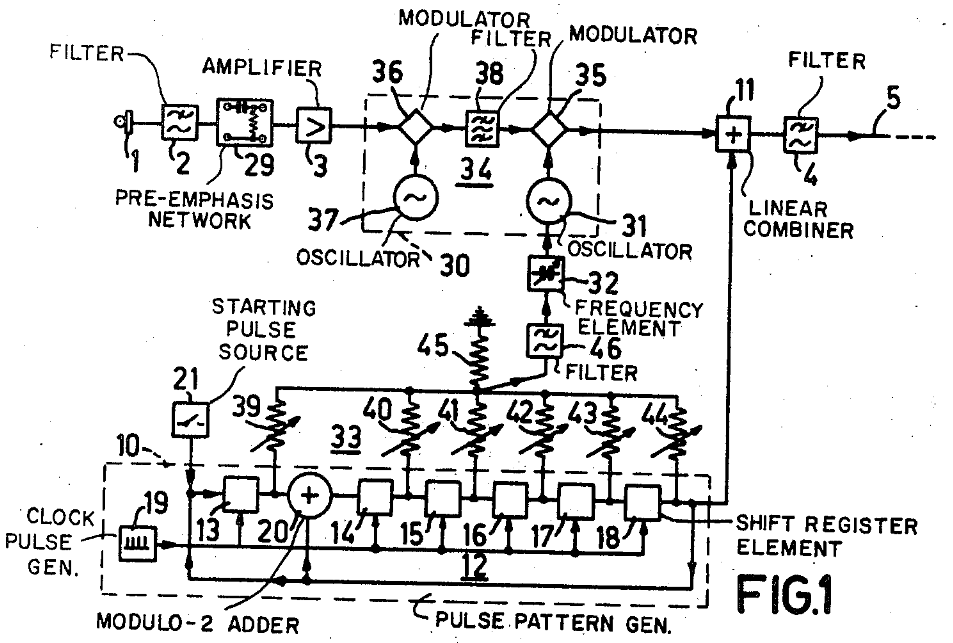
Figure 2:
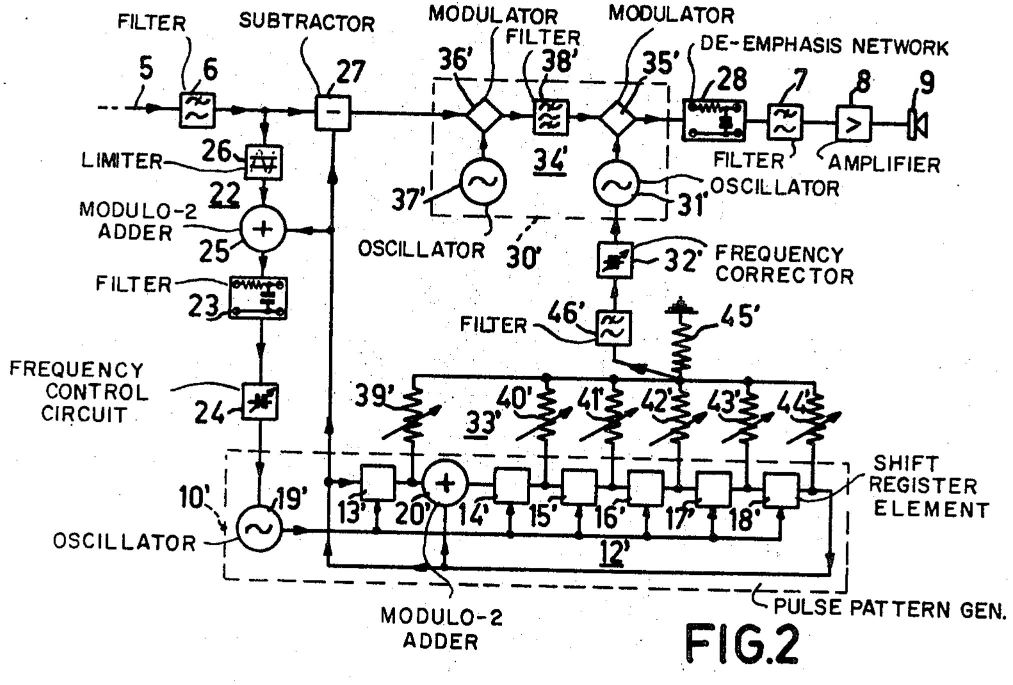
Figure 3:
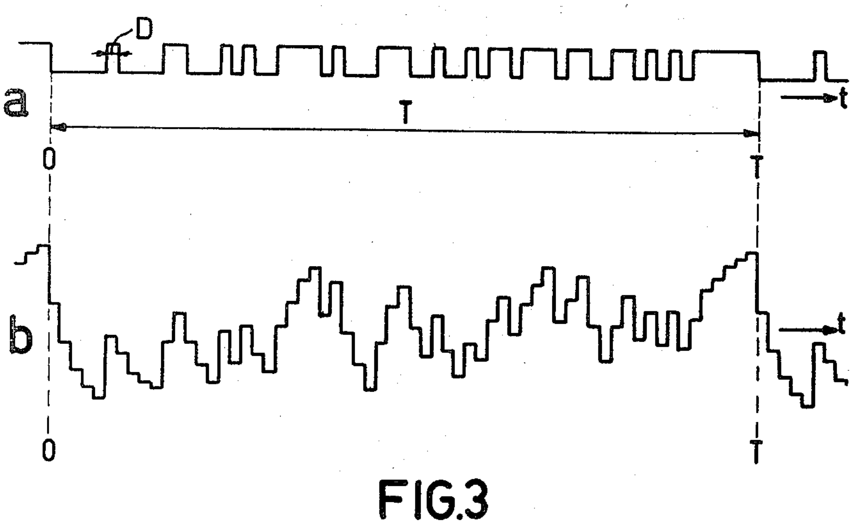
Figure 4:
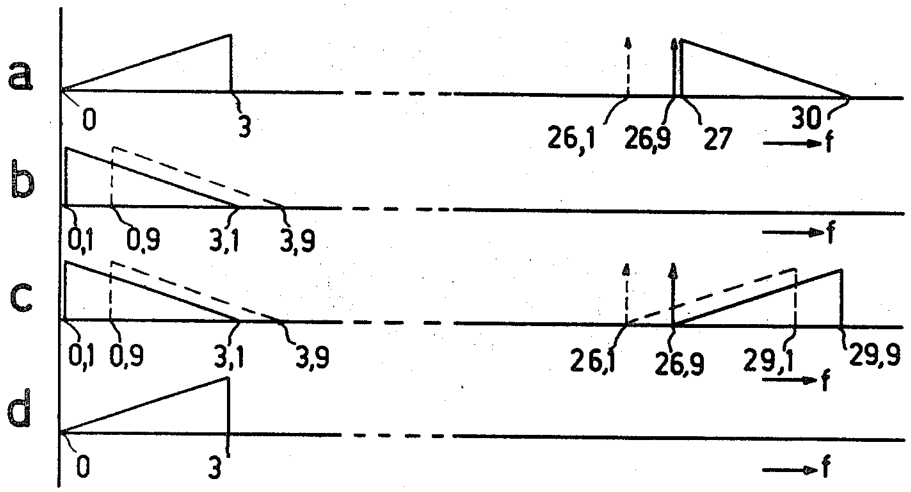

FIGS. 1 and 2 show a transmitter and a receiver of a transmission system according to the invention and FIG. 3 shows a few time diagrams and FIG. 4 a few frequency diagrams for explaining the operation of the transmitter and the receiver of FIGS. 1 and 2.

FIG. 1 shows a transmitter of a transmission system according to the invention suitable for a direct transmission of a speech signal located in a frequency band of 0 to 4 kcs. The speech signal emanating from a microphone 1 is applied in this transmitter via a speech signal filter 2 having a cut-off frequency of 3 kcs to an amplifier 3 and subsequent to amplification it is passed through a low pass filter 4 having a cut-off frequency of 4 kcs to a transmission line 5 for transmission to the receiver shown in FIG. 2. In the receiver the speech signal arriving via the transmission line 5 is passed through a low pass filter 6 having a cut-off frequency of 4 kcs to a speech filter 7 having a cut-off frequency of 3 kcs and subsequent to amplification in an amplifier 8 it is applied to the reproducing device 9.

Apart from the speech signal a synchronizing signal is transmitted in this system so that the information to be transmitted in total comprises a main information signal formed by the speech signal and an auxiliary information signal formed by the synchronizing signal whose information contents are considerably smaller than those of the speech signal.

In order to obtain a particularly effective transmission of the information in this system it has been proposed to form the auxiliary information signal, operating as a synchronizing signal, by a periodical pulse pattern located within the frequency band of the speech signal of 0 to 4 kcs and non-correlated to the speech signal and provided by a pulse pattern generator 10 in the transmitter, which pattern is combined in a linear combination device 11 without frequency separation and without time seperation with the speech signal within the prescribed frequency band of 0 to 4 kcs.

In the transmitter shown in FIG. 1 the pulse pattern generator 10 is formed by a fedback shift register 12 having a number of elements 13, 14, 15, 16, 17, 18 the contents of which are shifted on by a clock-pulse generator 19, connected to the shift register 12 with a constant shift period D, corresponding to a clock-pulse frequency of for example 2 kcs and by a modulo 2 adder 20 connected between the shift register elements 13 and 14 whilst the output of the shift register 12 is connected on the one hand to the second input of the modulo 2 adder 20 and on the other hand to the input of the shift register 12, to which moreover a starting pulse source 21 is connected. If, when the pulse pattern generator 10 is switched on the starting pulse source 21 provides a starting pulse, the shift register 12, owing to the feedback, will generate a sequence of pulses with a recurring period T which, as may be shown, in the shift register 12 of FIG. 1 has a length $T = (2^6 - 1)\ D = 63\ D$. In the embodiment shown the pulse pattern at the output of the shift register has the form shown in FIG. 3*a*, which pulse pattern is combined in the linear combination device 11 with a level of for example 20 dB below the speech signal within the prescribed frequency band of 0 to 4 kcs with the speech signal.

In the associated receiver the speech signal and the pulse pattern located with the prescribed frequency band of 0 to 4 kcs and combined linearly with the former are applied in common to a modulation device 22, to which, in addition, the locally obtained pulse pattern is applied, which is provided by a pulse pattern generator 10', corresponding to the pulse pattern generator 10 of the transmitter, whilst the output of the modulation device 22 is connected to a smoothing filter 23, which is connected, for automatic phase correction to a frequency-determining member 24 of the local pulse pattern generator 19'.

In the embodiment shown in FIG. 2 the local pulse pattern generator 10' is constructed in the same way as the pulse pattern generator 10 of FIG. 1 and corresponding elements are designated by the same reference numerals but provided with an index in FIG. 2. The modulation device 22 of FIG. 2 is formed by a modulo 2 adder 25, preceded by a limiting member 26 which converts the incoming information signals into a bivalent signal. The second input of the modulo 2 adder 25 is connected to the local pulse pattern generator 10′, whereas the output is connected to a smoothing filter formed by an integrating network 23, the output voltage of which controls a frequency corrector 24, constructed for example as a variable reactance and connected to an oscillator 19′, operating as a local clock-pulse generator. To the modulo 2 adder 25 is applied on the one hand the incoming information signal formed by the speech signal and the pulse pattern and on the other hand the local pulse pattern which corresponds in form but which does not correspond in phase with the pulse pattern produced at the transmitter end.

Since the speech signal and the pulse pattern are non-correlated an integration voltage will be produced at the output of the integrating network 23 which voltage assumes a maximum value at the coincidence of the two pulse patterns and is proportional to the time shifts of the pulse patterns relatively to each other smaller than D, whereas it has a constant minimum value in the case of greater time shifts. By applying this integration voltage as a control voltage to the frequency corrector 24 an accurate phase stabilisation of the local clock-pulse generator 19′ is obtained on the phase of the pulse pattern produced at the transmitter end.

In the transmission system described above the transmission of the pulse pattern used as a synchronizing signal does not require additional frequency and time space and moreover the influence of the synchronizing signal on the speech quality can be reduced considerably. The influence on the speech signal, which is already low due to the low level of the pulse pattern, can be further reduced by subtracting the local pulse pattern from the incoming information signal in a linear subtracting device 27, whilst the displacement of the frequency spectrum used by this subtraction in the remaining pulse pattern to higher frequencies permits a further reduction of said influence by using a de-emphasis network 28. At the transmitter end a corresponding pre-emphasis network 29 has to be used for the speech signal.

In the transmission system so far described the information signal is transmitted without frequency separation and without time seperation in the speech signal frequency band of 0 to 4 kcs whilst the speech quality is substantially not affected by the synchronizing signal. At the reproducing member 9 the residual synchronizing signal remains for example 50 to 60 dB below the level of the speech signal.

For keeping a secret the speech signals to be transmitted in this transmission system in a simple manner according to the invention the circuit of the speech signal at the transmitter end and at the receiver end includes a frequency transposition stage 30, 30′, fed by a carrier oscillator 31, 31′ which is connected, for varying the carrier frequency, to a frequency corrector 32, 32′ to which is connected the shift register 12, 12′ via an impedance network 33, 33′.

In the embodiment shown the frequency transposition stage 30 of the transmitter is formed by a single sideband modulation device 34 which transposes the incoming speech signal to a higher frequency band, after which is connected a second modulation device 35 which retransposes the speech signal of the higher frequency band in an inverted frequency state to the frequency band of the speech signal. The single side-band modulation device 34 is formed here by a push-pull modulator 36, for example a ring modulator, fed by a carrier oscillator 37 of 30 kcs and provided with a single side-band filter 38 having a passband of 27–30 kcs whereas the second modulation 35 is formed by an amplitude modulator 35 fed by the carrier oscillator 31 of 26.5 kcs for which the lowpass filter 4 of a cut-off frequency of 4 kcs serves as an output filter. In this frequency transposition stage 30 the speech signal of 0 to 3 kcs modulates in the push-pull modulator 36 with carrier wave suppression the carrier wave of a frequency of 30 kcs, after which the lower side band of 27 to 30 kcs is filtered out by the single sideband filter 38 and remodulated in the amplitude modulator 35 by means of the carrier frequency of 26.5 kcs in an inverted frequency position to the prescribed frequency band of 0 to 4 kcs, whilst as a result of the inverted frequency position a so-called inverted speech signal is produced.

In order to vary the carrier frequency of the carrier oscillator 31 of this embodiment, which has a nominal value of 26.5 kcs, the carrier oscillator 31 has connected to it a frequency corrector 32, for example a variable reactance, whose control voltage is derived from the pulse pattern generator 10, for which purpose the shift register elements 13, 14, 15, 16, 17, 18 are connected via an impedance network formed by a resistor network 33, comprising adjustable resistors 39, 40, 41, 42, 43, 44, linked to a combination member formed by a resistor 45 and through a lowpass filter 46 to the frequency corrector 32.

At the appearance of a clock-pulse of the clock-pulse generator 19 the contents of the elements 13 to 18 are varied, so that in the combination device formed by the resistor 45 a voltage is produced, which is determined by said contents of the elements 13 to 18 and the ratio between the values of the resistors 39 to 44, said voltage varying stepwise in the rhythm of the clock-pulse frequency of 2 kcs and being periodical with a period T like the pulse pattern produced by the generator 12 shown in FIG. 3*a*. If the resistors 39 to 44 are adjusted for example to values of 4.7; 6.8; 10; 15; 22; 33 kOhms, the combination device 45 provides a voltage of the waveform shown in FIG. 3*b* which voltage is applied through the lowpass filter 46 having a cut-off frequency of for example 1 kcs as a control voltage to the frequency corrector 32, where it produces a frequency variation according to the curve of FIG. 3*b* of the carrier frequency of the oscillator 31, which frequency produces, via the frequency transposition stage 30, a corresponding frequency variation of the inverted speech signal at the output of the transmitter. The frequency corrector 32 may be constructed so that the extreme values of the curve in FIG. 3*b* correspond to a carrier frequency of 26.1 and 26.9 kcs.

For illustrating the operation of the transmitter shown in FIG. 1 the frequency diagram of FIG. 4*a* indicates: the speech signal in the band of 0 to 3 kcs, the single sideband signal in the band of 27 to 30 kcs and the varying frequency of the carrier wave oscillator 31, where only the extreme values of 26.1 and 26.9 kcs are indicated by a broken arrow and a full arrow respectively. Owing to the transposition of the single sideband signal in the band of 27 to 30 kcs by means of a carrier frequency varying between 26.1 and 26.9 kcs the inverted speech signal of FIG. 4*b* is obtained, which lies between 0.9 and 3.9 kcs and between 0.1 and 3.1 kcs at the extreme values of 26.1 kcs and 26.9 kcs respectively.

Thus the output of the transmitter provides within the speech signal band of 0 to 4 kcs an inverted speech signal varying in frequency in the rhythm of the clock-pulse frequency according to the curve of FIG. 3*b*, which signal appeared to be quite unintelligible both by direct listening and subsequent to frequency inversion.

In order to render the speech signal transmitted by the transmitter intelligible in the receiver, the latter is provided also with a frequency transposition stage 30', which is constructed and controlled in the same manner as the frequency transposition stage 30 of the transmitter; corresponding members in FIGS. 1 and 2 are designated by the same reference numerals but in FIG. 2 an index is added thereto.

Particularly the control voltage produced in the receiver for the frequency corrector 32' which controls the carrier wave oscillator 31' in the frequency transposition stage 30', corresponds completely with the control voltage produced in the transmitter not only with respect to wave form owing to the identical construction of the shift registers 12 and 12' of the resistor network 33 and 33' but also with respect to phase, since as a result of the phase stabilisation of the local clock-pulse generator 19' on the phase of the pulse pattern of the transmitter the pulse pattern of the transmitter and the local pulse pattern coincide so that also the contents of the shift registers 12 and 12' are at any moment the same. This complete equality of the control voltages at the frequency correctors 32, 32' produces a frequency variation of the carrier wave oscillators 31, 31' in synchronism in the transmitter and in the receiver, said variation having the shape of the curve of FIG. 3*b* with the given choice of the resistance values of the resistor network 33, 33'.

Since furthermore in the receiver the incoming speech signal in the frequency band of 0 to 4 kcs and the single side-band signal of 26 to 30 kcs obtained therefrom by means of the single sideband modulation device 34' exhibit variations in the frequency position, which as stated above, for the frequency variation of the carrier frequency oscillator 31' of the receiver, correspond completely with the frequency variation of the carrier wave oscillator 31 of the transmitter, the transposition of single sideband with this carrier frequency will result in the restoration of the original speech signal in the speech signal band of 0 to 3 kcs.

For illustrating the operation of the receiver the frequency diagram of FIG. 4*c* indicates: the incoming speech signal varying between 0.1 and 3.1 kcs and 0.9 to 3.9 kcs, the single sideband signal varying between 26.1 and 29.1 kcs and 26.9 to 29.9 kcs and the carrier frequency of the carrier oscillator 31' varying between 26.1 and 26.9 kcs, where only the extreme values of the variations are indicated in the same manner as in FIG. 4*b*. Owing to the transposition of the single sideband signal varying in frequency position with a correspondingly varying carrier frequency at the reproducing member 9 the speech signal of FIG. 4*d* is produced which corresponds completely with the speech signal at the microphone 1.

In this transmission system a high degree of secrecy of the speech signals to be transmitted in a frequency band of 0 to 3 kcs is obtained in a transmission band of not more than 4 kcs, which secrecy can be revealed only with great difficulty. For this purpose it is necessary to know at the same time:

1. the scheme of the frequency transposition employed,
2. the accurate construction of the pulse pattern generators 10, 10',
3. the construction and the data of the resistor networks 33, 33',
4. the phase of the pulse pattern transmitted.

Moreover the degree of secrecy can be enhanced in a very simple manner by using the pulse pattern not only for the phase stabilisation of the local clock-pulse generator 19' but also by deriving from the pulse pattern the synchronizing signal by using the periodicity of the pattern in order to synchronize programming devices at the transmitter and at the receiver, which cause, in a predetermined manner, synchronous modifications for example in the resistor networks 33, 33' or in the construction of the fedback shift register 12, 12' in the transmitter and in the receiver. Such a synchronizing signal may be obtained, for example, by connecting all shift register elements 13 to 18 and 13' to 18' to an AND-gate which provides an output pulse solely in the state of the shift registers 12, 12' occurring only once in the period T, in which a pulse occurs at the same time at the outputs of all shift register elements 13 to 18 and 13' to 18'.

For improving the intelligibility it appears to be advantageous to include, after the pre-emphasis network 29, a limiter for limiting the peaks of the speech signal.

What is claimed is:

1. A transmission system for the transmission of information in a predetermined frequency band, comprising a transmitter and a receiver, said transmitter comprising a source of main information signals, a source of auxiliary information signals in the form of a periodic pulse pattern that is not correlated with said main signals, a source of transposing oscillations, means for modulating said main information on said transposing oscillations, means for varying the frequency of said transposing oscillations with said auxiliary signals, and means for linearly adding and transmitting said auxiliary signals and the output of said modulating means without frequency separation and without time separation; said receiver comprising means for receiving said linearly added signals, a source of local information signals in the form of the periodic pulse pattern generator by said source of said auxiliary signals, first modulator means, means applying said receiver signals and said local information signals to said first modulator means for producing a control signal for automatic phase connection of said local information signals, an output circuit, and frequency transposing means for applying said receiver signals to said output circuit, said frequency transposing means comprising second modulator means, a source of local oscillations connected to said second modulator means, and means for carrying the frequency of said local oscillations with said local information signals.

2. The system of claim 1 in which said source of auxiliary oscillations and said source of local information each comprise a source of clock pulses, a shift register having a plurality of stages, and means for applying said clock pulses to said shift register.

3. The system of claim 2 wherein said transmitter comprises a first impedance network connected to the stages of the respective shift register for producing a control voltage for varying the frequency of said transposing oscillations, and said receiver comprises a second impedance network connected to the stages of the respective shift register for producing a control voltage for varying the frequency of said local oscillations.

4. The system of claim 3 wherein each said impedance network comprises a resistor network of resistors connected to the stages of said shift register.

5. The system of claim 4 wherein said resistor network is comprised of adjustable resistors each connected to a separate register stage, and combining means connected to said adjustable resistors.

6. The system of claim 5 wherein said combining means comprises a resistor, and low pass filter means connected to said resistor for applying the voltage across said resistor to the respective oscillator.

7. The system of claim 1 wherein said means for modulating said main signals on said transposing oscillations comprises single sideband modulating means for transposing the frequency of said main signals before they are modulated on said transposing oscillations, and said transposing means in said receiver comprises means for transposing the frequency of said received signals before they are applied to said second modulator means.

8. The system of claim 7 wherein said single sideband modulating means inverts the frequency position of said main signal, and said means for transposing in said receiver comprises means for inverting the frequency position of said received signal.

* * * * *